(No Model.)
D. ROGERS.
PUZZLE.
No. 591,639. Patented Oct. 12, 1897.
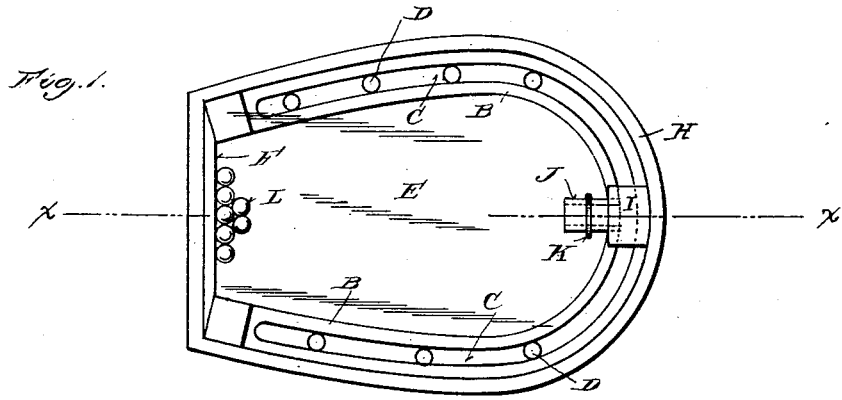
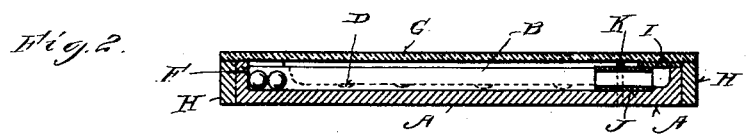
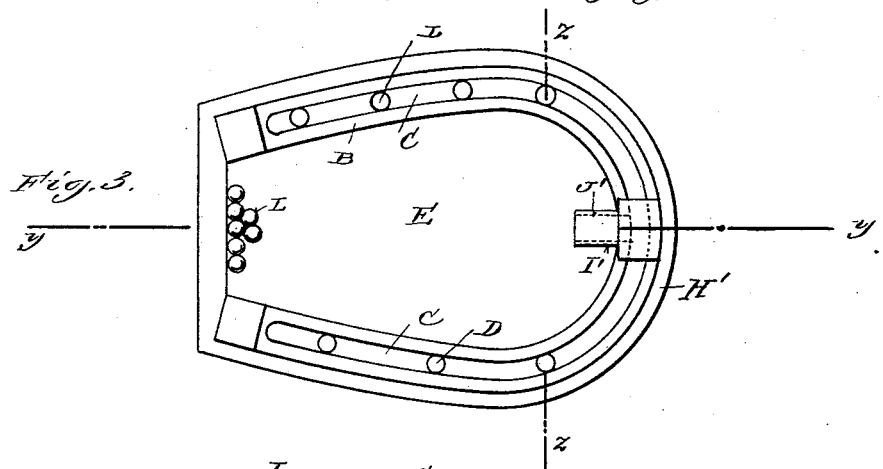
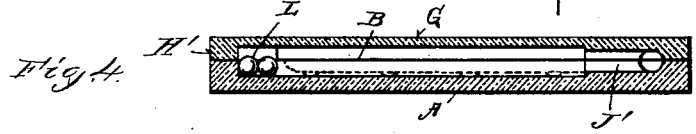
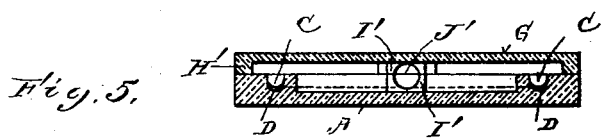
Witnesses
Jas. C. Dawley
W. M. McNair
Inventor
Douglas Rogers,
By his Attorney
H. A. Toulmin

UNITED STATES PATENT OFFICE.

DOUGLAS ROGERS, OF SPRINGFIELD, OHIO, ASSIGNOR TO GEORGE S. BOWERS AND ALBERT MEISE, OF SAME PLACE.

PUZZLE.

SPECIFICATION forming part of Letters Patent No. 591,639, dated October 12, 1897.

Application filed July 10, 1897. Serial No. 644,124. (No model.)

*To all whom it may concern:*

Be it known that I, DOUGLAS ROGERS, a citizen of the United States, residing at Springfield, in the county of Clark and State of Ohio, have invented certain new and useful Improvements in Puzzles, of which the following is a specification, reference being had therein to the accompanying drawings.

This invention relates to certain new and useful improvements in puzzles.

The object of my invention is, first, to produce an interesting puzzle, so as to induce close inspection of and familiarity with the device, whereby it will carry out a secondary object—namely, will constitute a good advertising medium, the advertisements being unavoidably read over and over again and made familiar with the uses of the puzzle.

The essential features of my said puzzle are a field or space for minute balls or shot, a wall about such field or space substantially in the form of a horseshoe with depressions to indicate nail-holes, and with a passage or throat adapted to convey balls from an inner field to a groove or channel in the horseshoe in which the balls are distributed into the depressions, which is the ultimate thing to be accomplished in the puzzle.

In the accompanying drawings, on which like reference-letters indicate corresponding parts, Figure 1 is a plan view of my improved puzzle; Fig. 2, a longitudinal sectional view on the line $x\,x$ of Fig. 1; Fig. 3, a similar plan view to Fig. 1; Fig. 4, a similar sectional view to Fig. 2, being taken on the line $y\,y$ of Fig. 3; and Fig. 5, a vertical transverse sectional view taken on the line $z\,z$ of Fig. 3, Figs. 3, 4, and 5 showing a modification in the manner of constructing the device.

The letter A designates the base or bottom of the device, the same being formed with a raised outer portion or wall B, grooved in the top, as shown at C, provided at intervals with depressions D. The outline of the wall B is substantially that of a horseshoe, being indicative of good luck according to a popular notion. The groove C is similar to that formed in the bottom of horseshoes for the reception of nails used in securing shoes to the hoofs of horses. This groove, however, in the case of my device is extended clear around and across the toe, so as to make a channel in which certain balls or shot can be manipulated and allowed to run. The depressions D are somewhat indicative of nail-holes in horseshoes, but instead of being holes clear through the device they are merely depressions in which the balls or shot are to be run and held. Within the wall B is a field or space E, inclosed by such wall and by a strip F, extending from heel to heel of the shoe-like formation. A cover or top G is provided, preferably of glass, so that it will be transparent, whereby the balls or shot and the grooves and sockets can be seen. This cover or top has a ledge H, which extends all around it and fits down over and snugly embraces the edges of the base A. A plate I covers over a part of the groove C, and a tube J extends from this covered part of the groove out a short distance into the field or space E and itself substantially flush with such field or surface, so that the balls or shot will readily run into this tube and thence pass into the groove. In this form of construction the device is made up of several pieces of metal or wood, or both, or other material may be used. In the form of construction shown in Figs. 3 to 5, inclusive, the same arrangement and design are preserved, but the device is made of two pieces of glass, and the ledge is modified, as shown at H', so as to rest upon the base, and the two parts are cemented or otherwise fastened together. The specific plate I and tube J, with its holding device K, are omitted, but the equivalent passage J' is formed in the thickened part I'.

On the field or surface E suitable advertising matter is to be placed, as also in some cases on a part of the top G and also on the bottom of the base A, and possibly on the outer side of the ledge H or H'. A close inspection of the device, due to attempting to work out the puzzle, will bring this advertising matter before the person in such a manner as to result in its being read, even unintentionally. The balls or shot L are made of any suitable material, as lead. It is designed to have one ball for each of the seven depressions D, there usually being seven nail-holes in a horseshoe. The thing to accomplish is to cause the balls to roll into the tube J, the passage J', and thence to distribute them through the groove and to make one ball enter and remain in each of the depressions in such manner that finally all of the balls will be at rest in these depressions.

While I have shown and described the depressions and will use them in nearly all, if not all, cases, still the puzzle is attractive in the mere matter of getting the balls from the field into the groove, and hence the depressions may sometimes be omitted.

Having thus fully described my invention, what I claim as new, and desire to secure by Letters Patent, is—

1. In a puzzle, a structure having a field or surface, a groove partially encircling the same with depressions in the groove and a passage from the field to the groove, in combination with rolling objects adapted to be placed on said field and thence rolled into the groove through said passage and finally located in the depressions.

2. In a puzzle, a base having a raised surface or wall partially encircling it, with a groove in said raised surface or wall and depressions in the groove, a space within the raised surface or wall forming a closed field adapted to contain rolling objects, and a cover for the base which incloses said field and groove, the raised surface or wall having a tubular passage from said field to said groove and rolling objects primarily located upon said field.

3. In a puzzle, a base and a top adapted to be secured together, and a field, a groove with depressions, and a passage from the field into the groove.

4. In a puzzle, a glass or transparent base, a top having formed therein an interior field, a partially-encircling groove with a wall between the field and groove, a passage leading from the field into the groove and a series of depressions in the groove.

5. In a puzzle, the combination with the base and a top having formed therein an inclosed field, a partially-encircling groove and a passage leading from the field into the groove.

In testimony whereof I affix my signature in presence of two witnesses.

DOUGLAS ROGERS.

Witnesses:
OLIVER H. MILLER,
W. M. MCNAIR.